(12) United States Patent
Bestler (10) Patent No.: US 8,006,065 B2
(45) Date of Patent: *Aug. 23, 2011

(54) METHOD AND SYSTEM FOR COMBINING PAGE BUFFER LIST ENTRIES TO OPTIMIZE CACHING OF TRANSLATED ADDRESSES

(75) Inventor: Caitlin Bestler, Laguna Hills, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/947,496

(22) Filed: Nov. 16, 2010

(65) Prior Publication Data

US 2011/0066824 A1  Mar. 17, 2011

Related U.S. Application Data

(63) Continuation of application No. 11/515,563, filed on Sep. 5, 2006, now Pat. No. 7,836,274.

(51) Int. Cl.
*G06F 9/30* (2006.01)

(52) U.S. Cl. ......... 711/203; 711/209; 711/218; 711/220

(58) Field of Classification Search .................. None
See application file for complete search history.

(56) References Cited

U.S. PATENT DOCUMENTS

| 6,981,120 | B1 | 12/2005 | Barrus et al. |
| 7,299,266 | B2 | 11/2007 | Boyd et al. |
| 7,506,084 | B2 | 3/2009 | Moerti et al. |
| 2005/0144422 | A1 | 6/2005 | McAlpine et al. |
| 2006/0236063 | A1 | 10/2006 | Hausauer et al. |

*Primary Examiner* — Hetul Patel
(74) *Attorney, Agent, or Firm* — McAndrews, Held & Malloy, Ltd.

(57) ABSTRACT

Certain aspects of a method and system for combining page buffer list entries (PBLEs) to optimize caching of translated addresses are disclosed. Aspects of a method may include encoding at least two page buffer list entries in a remote direct memory access (RDMA) memory map into at least two contiguous memory locations by utilizing a remainder of a physical address corresponding to the two page buffer list entries. The first memory location of the two contiguous memory locations may comprise a base address and a contiguous length of the first page buffer list entry. The second memory location of the two contiguous memory locations may comprise a virtual address and a contiguous length of the second page buffer list entry.

22 Claims, 5 Drawing Sheets

METHOD AND SYSTEM FOR COMBINING PAGE BUFFER LIST ENTRIES TO OPTIMIZE CACHING OF TRANSLATED ADDRESSES

CROSS-REFERENCE TO RELATED APPLICATIONS/INCORPORATION BY REFERENCE

This application is a continuation of U.S. Ser. No. 11/515,563 filed on Sep. 5, 2006.

FIELD OF THE INVENTION

Certain embodiments of the invention relate to memory mapping. More specifically, certain embodiments of the invention relate to a method and system for combining page buffer list entries (PBLEs) to optimize caching of translated addresses.

BACKGROUND OF THE INVENTION

The end-to-end performance of IP networks for bulk data transfer may be limited by data copying overhead in end systems. Even when end systems may be able to sustain the bandwidth of high-speed networks, copying overheads may limit their ability to carry out other processing tasks. Remote direct memory access (RDMA) is a protocol, which may be utilized to avoid copying for network communication. The RDMA protocol may be useful for systems and/or protocols that transmit bulk data mixed with control information, such as network file system (NFS), common Internet file system (CIFS), hyper text transfer protocol (HTTP), or encapsulated device protocols such as Internet small computer systems interface (iSCSI). The Internet and IP networks may be utilized for buffer-to-buffer transfers, for example, in the form of file or block transfers by utilizing a variety of protocols, for example, HTTP, file transfer protocol (FTP), NFS, and CIFS. These upper-layer protocols (ULPs) may be enabled to transmit data that are uninterrupted by the protocol or the network. Each ULP may have a plurality of ways of requesting and initiating data transfers. For example, one use of HTTP may be to transfer JPEG format graphic images from a web server to a web browser's address space.

The data may be placed in the correct memory buffer directly as it arrives from the network, avoiding the need to store the data and subsequently recopying it into the correct buffer after it has arrived. If the network interface card (NIC) can place data correctly in memory, the memory bandwidth may be freed and the CPU cycles consumed by copying may be reduced. A number of mechanisms already exist to reduce copying overhead in the IP stack. Some of these mechanisms depend on fragile assumptions about the hardware and application buffers, while others involve ad hoc support for specific protocols and communication scenarios.

The RDMA protocol offers a solution that is simple, general, complete, and robust. The RDMA protocol introduces new control information into the communication stream that directs data movement to facilitate buffer-to-buffer transfers. Incorporating support for RDMA into network protocols may significantly reduce the cost of network buffer-to-buffer transfers. The RDMA protocol accomplishes exact data placement via a generalized abstraction at the boundary between the ULP and its transport, allowing an RDMA-capable NIC to recognize and steer payloads independently of the specific ULP. By using RDMA, the ULPs may gain efficient data placement without the need to program ULP-specific details into the NIC. The RDMA protocol speeds deployment of new protocols by not requiring the firmware or hardware on the NIC to be rewritten to accelerate each new protocol. To be effective, the receiving NIC may recognize the RDMA control information, and ULP implementations or applications may be modified to generate the RDMA control information. In addition, support for framing in the transport protocols may allow an RDMA-capable NIC to locate RDMA control information in the stream when packets arrive out of order.

Direct memory access (DMA) is a technique that is widely used in high-performance I/O systems. DMA allows a device to directly read or write host memory across an I/O interconnect by sending DMA commands to the memory controller. No CPU intervention or copying is required. For example, when a host requests an I/O read operation from a DMA-capable storage device, the device may use a DMA write to place the incoming data directly to memory buffers that the host provides for that specific operation. Similarly, when the host requests an I/O write operation, the device may use a DMA read to fetch outgoing data from host memory buffers specified by the host for that operation.

The RDMA protocol specifies dividing of long RDMA messages into multiple segments. These segments may reference virtually contiguous memory at their destination. The operating systems may prefer to allocate physically contiguous pages for virtually contiguous address ranges. With a conventional page buffer list (PBL) organization, an RDMA enabled NIC (RNIC) may make multiple successive lookups to the PBL for pages that may be physically contiguous.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for combining page buffer list entries (PBLEs) to optimize caching of translated addresses, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for combining page buffer list entries (PBLEs) to optimize caching of translated addresses. Aspects of the method and system may comprise encoding at least two page buffer list entries in a remote direct memory access (RDMA) memory map into at least two contiguous memory locations by utilizing a remainder of a physical address corresponding to the two page buffer list entries. The first memory location of the two contiguous memory locations may comprise a base address and a contiguous length of the first page buffer list entry. The second memory location of the two contiguous memory locations may comprise a virtual address and a contiguous length of the second page buffer list entry. A single lookup using an optimized PBL format may be enabled to translate multiple successive segments that may span a plurality of virtual pages.

Figure 1:
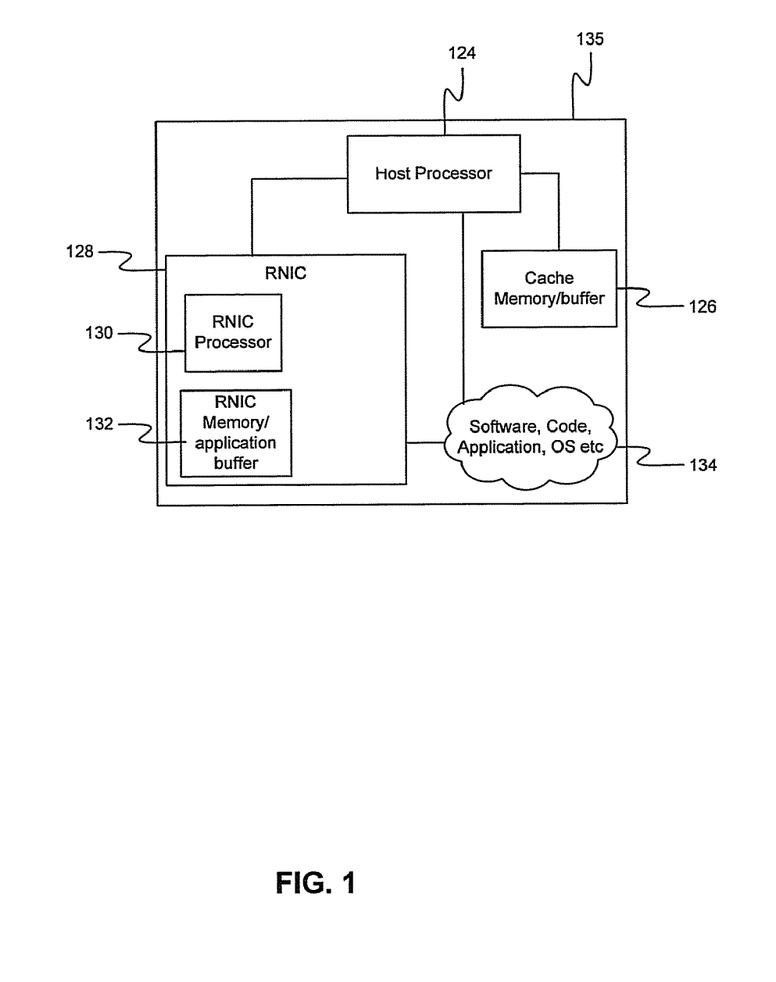
FIG. 1 is a block diagram of architecture of an exemplary system for combining page buffer list entries (PBLEs) to optimize caching of translated addresses, in accordance with an embodiment of the invention.

FIG. 1 is a block diagram of architecture of an exemplary system for combining page buffer list entries (PBLEs) to optimize caching of translated addresses, in accordance with an embodiment of the invention. Referring to FIG. 1, there is shown a hardware block 135. The hardware block 135 may comprise a host processor 124, a cache memory/buffer 126, a software algorithm block 134 and a RNIC block 128. The RNIC block 128 may comprise a RNIC processor 130, and a RNIC memory/application buffer block 132. The RNIC block 128 may communicate with an external network via a wired and/or a wireless connection, for example. The wireless connection may be a wireless local area network (WLAN) connection as supported by the IEEE 802.11 standards, for example.

A RDMA aware NIC (RNIC) interface 128 may be enabled to support a page physical buffer type and a block physical buffer type of memory mapping. The memory associated with a physical buffer list may be pinned by the RNIC interface 128. A page list may be defined by a plurality of attributes, for example, page size, address list, a first byte offset (FBO) and the length of the page.

The page size may be calculated as the number of bytes, for example, of each page in the list. An address list may be a list of addresses that may refer to the physical pages referenced by the page list. The address list may be characterized by a plurality of attributes, for example, the pages in a page list may have the same size, and that size may be a power of two. The page addresses may be an integral number of the page size. For example, each address in the address list modulo page size may equal zero. The offset to the start of a memory region within the first page may be referred to as the first byte offset (FBO). The length of the page may be the total length in bytes of the memory region.

A block list may be defined by a plurality of attributes, for example, block size, address list, a first byte offset (FBO) and the length of the block. The block size may be calculated as the number of bytes, for example, of each block in the list. An address list may be a list of addresses that may refer to the physical blocks referenced by the block list. The address list may be characterized by a plurality of attributes, for example, each block in the address list may have the same size. The RNIC interface 128 may allow block addresses to have an arbitrary byte alignment. The offset to the start of a memory region within the first block may be referred to as the first byte offset (FBO). The length of the block may be the total length in bytes of the memory region.

Figure 2A:
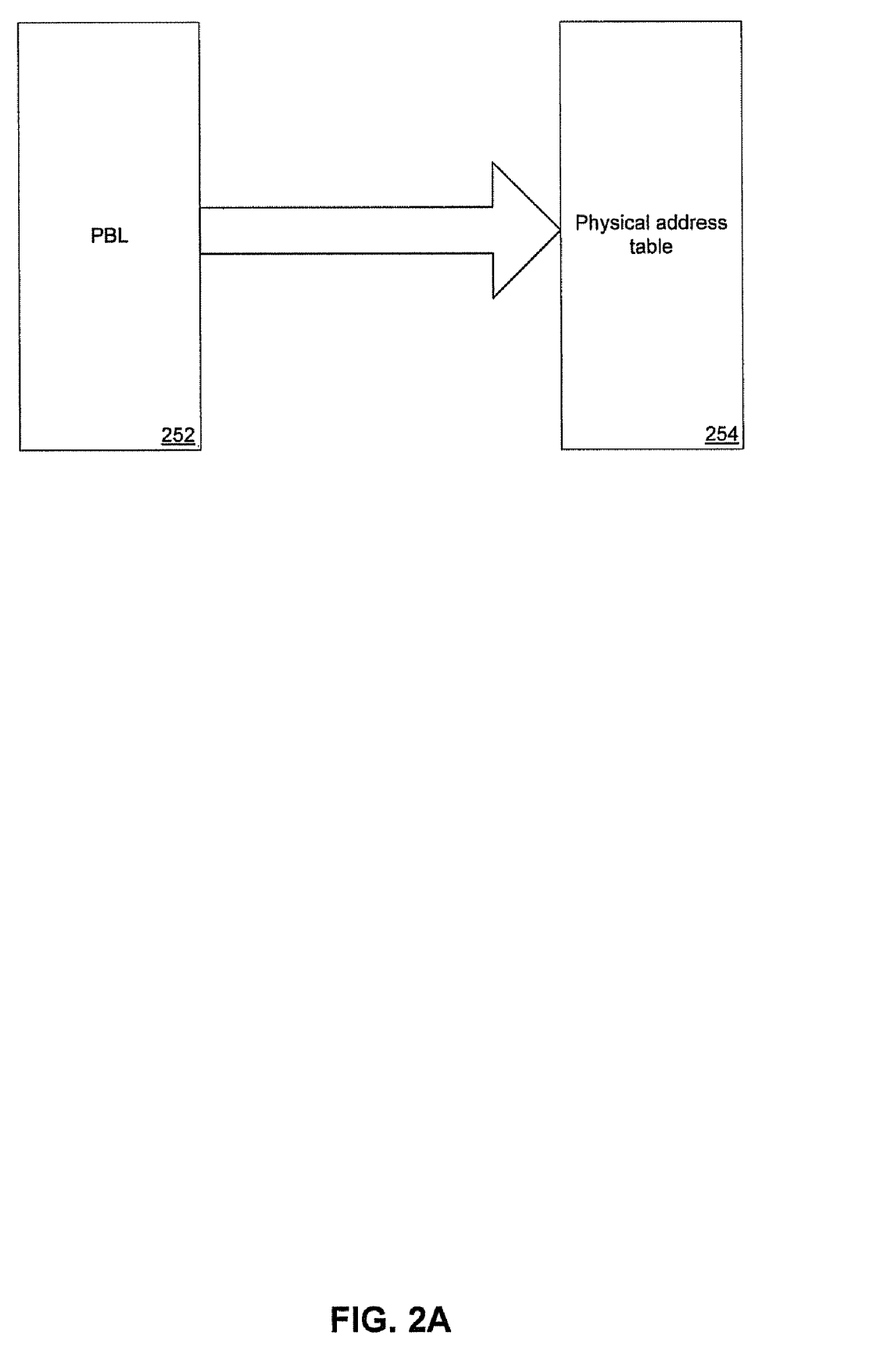
FIG. 2A is a block diagram of an exemplary system illustrating page buffer list entries (PBLEs), in accordance with an embodiment of the invention.

FIG. 2A is a block diagram of an exemplary system illustrating page buffer list entries (PBLEs), in accordance with an embodiment of the invention. Referring to FIG. 2A, there is shown a PBLE table 252 and a physical address table 254.

The physical address table 254 may comprise a plurality of physical addresses of various memory locations and the PBLE table 252 may comprise a plurality of corresponding PBLEs. The entries in an RDMA memory map that translate a logical page/block to a physical address may be referred to as page buffer list entries (PBLEs). The translation may be valid for a size of the page/block, and may be repeated whenever the desired logical address crosses a page/block boundary. A physical address may be utilized by the RNIC 128 to retrieve contents from the cache memory/buffer 126. The physical addresses may be determined via translation of the STag and tagged offset using memory translation and protection tables. In accordance with an embodiment of the invention, a pair of PBLEs may be fetched to prevent using an additional fetch operation in instances where a current message crosses the current page/block boundary.

Figure 2B:
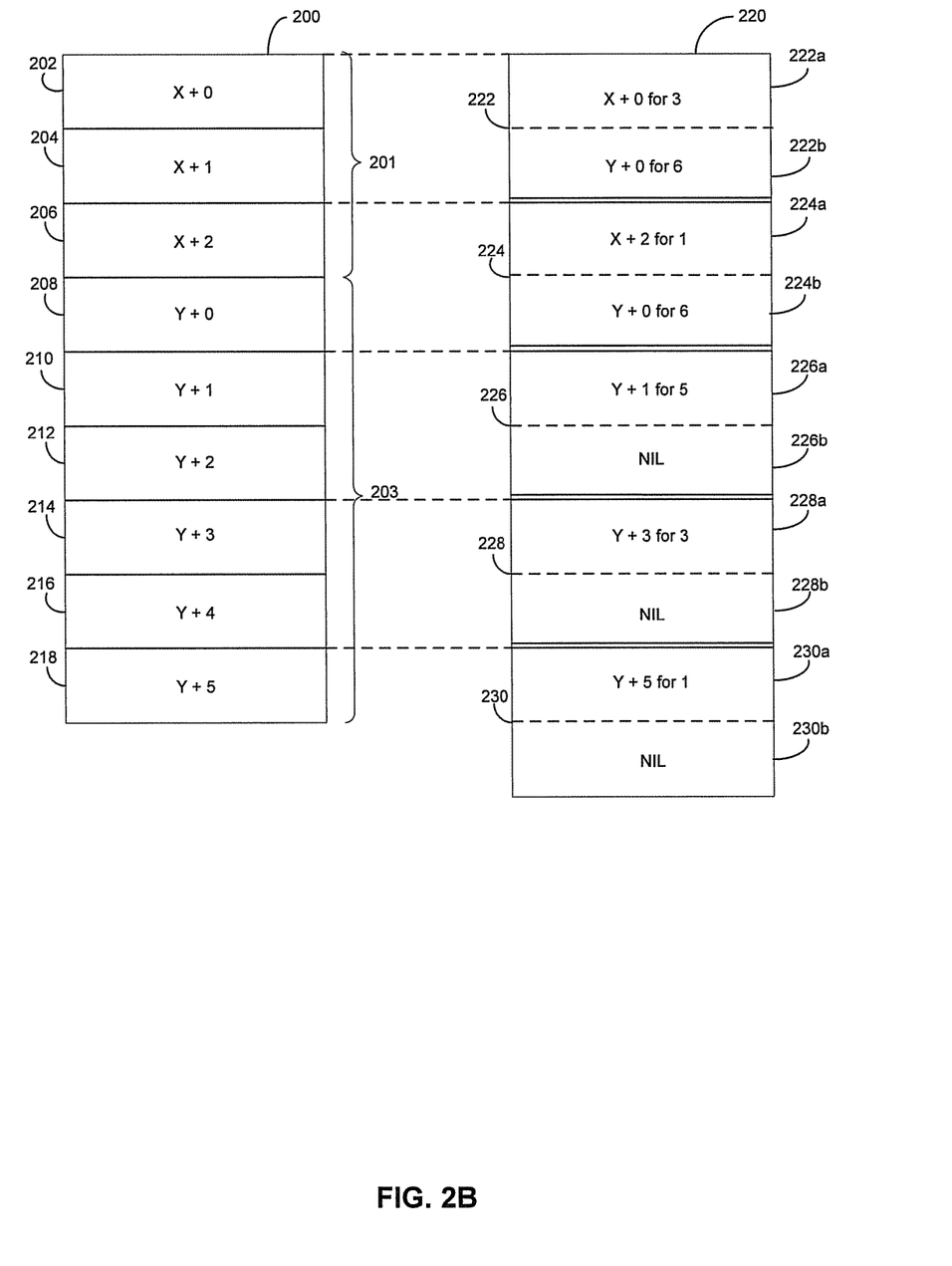
FIG. 2B is a block diagram of an exemplary system for combining page buffer list entries (PBLEs) to optimize caching of translated addresses, in accordance with an embodiment of the invention.

FIG. 2B is a block diagram of an exemplary system for combining page buffer list entries (PBLEs) to optimize caching of translated addresses, in accordance with an embodiment of the invention. Referring to FIG. 2B, there is shown a page buffer list 200, and an optimized PBLE table 220. The page buffer list 200 may comprise a plurality of PBLEs 201 and 203. The PBLE 201 may comprise a plurality of contiguous pages, X0 202, X1 204, and X2 206. Similarly, PBLE 203 may comprise a plurality of contiguous pages, Y0 208, Y1 210, and Y2 212, Y3 214, Y4 216, and Y5 218. The optimized PBLE table 220 may comprise a plurality of paired PBLEs 222, 224, 226, 228, and 230 that may represent different messages.

In accordance with an exemplary embodiment of the invention, at least two PBLEs may be encoded to at least two contiguous memory locations. For example, a paired PBLE 222 may comprise a first contiguous memory location 222a and a second contiguous memory location 222b. The first contiguous memory location 222a may comprise a base address X+0 and a contiguous length of 3 pages. The second contiguous memory location 222b may comprise a virtual address Y+0 and a contiguous length of 6 pages. In accordance with an embodiment of the invention, the encoding may be performed by utilizing a remainder of each physical address. During conventional encoding, the remainder of a physical address may not be utilized, because the translated address may be aligned to the page/block size, and the remainder may be zero.

The paired PBLE 224 may comprise a first contiguous memory location 224a and a second contiguous memory location 224b. The first contiguous memory location 224a may comprise a base address X+2 and a contiguous length of 1 page. The second contiguous memory location 224b may comprise a virtual address Y+0 and a contiguous length of 6 pages. The paired PBLE 226 may comprise a first contiguous memory location 226a and a second contiguous memory location 226b. The first contiguous memory location 226a may comprise a base address Y+1 and a contiguous length of 5 pages. The second contiguous memory location 226b may be NIL indicating the end of the message. The paired PBLE 228 may comprise a first contiguous memory location 228a and a second contiguous memory location 228b. The first contiguous memory location 228a may comprise a base address Y+3 and a contiguous length of 3 pages. The second contiguous memory location 228b may be NIL indicating the end of the message. The paired PBLE 230 may comprise a first contiguous memory location 230a and a second contiguous memory location 230b. The first contiguous memory location 230a may comprise a base address Y+5 and a contiguous length of 1 page. The second contiguous memory location 230b may be NIL indicating the end of the message.

Each physical address may be divided into three portions, for example, through arithmetic operators. The arithmetic operators may be similar to bit shifts, for example, when the page size is a power of two. The physical address of the first segment may be calculated according to the following equation:

$$seg\_phys\_addr[0]=pble\_entry[0]-pble\_entry[0] \bmod page\_block\_size$$

where seg_phys_addr[0] is the physical address of the first segment, pble_entry[0] is the first PBLE, and page_block_size is the size of the page/block. The portions encoded by pble_entry[0] mod page_block_size may indicate a span of the physically contiguous allocation covered by the corresponding pble_entry. The index, or offset, from the beginning of a physically contiguous region and a remaining length of the physically contiguous region may be calculated and may be encoded as the number of pages/blocks. The index of a particular page in a segment may be calculated according to the following equation:

$$seg\_pages[x]=(pble\_entry \bmod page\_block\_size) \text{div} MAX\_SEQ\_BLOCKS$$

where seg_pages[x] is the index of the $x^{th}$ page segment, and MAX_SEQ_BLOCKS is the maximum number of sequential blocks that can be represented plus one. The maximum number of sequential blocks, MAX_SEQ_BLOCKS may be less than the square root of the size of the page/block, page_block_ size. The number of pages in a segment for a given logical address may be obtained by calculated according to the following equation:

$$(pble\_entry \bmod page\_block\_size) \bmod MAX\_SEQ\_BLOCKS$$

This equation reduces to pble_entry mod MAX_SEQ_BLOCKS when page_block_size mod MAX_SEQ_BLOCKS is zero. The index or offset encoded in the second pble_entry of a pair may be zero, since it may denote the beginning of a new physically contiguous region. The logical address of a second segment may be calculated by adding the size of the first segment to the logical address of the first segment.

Figure 2C:
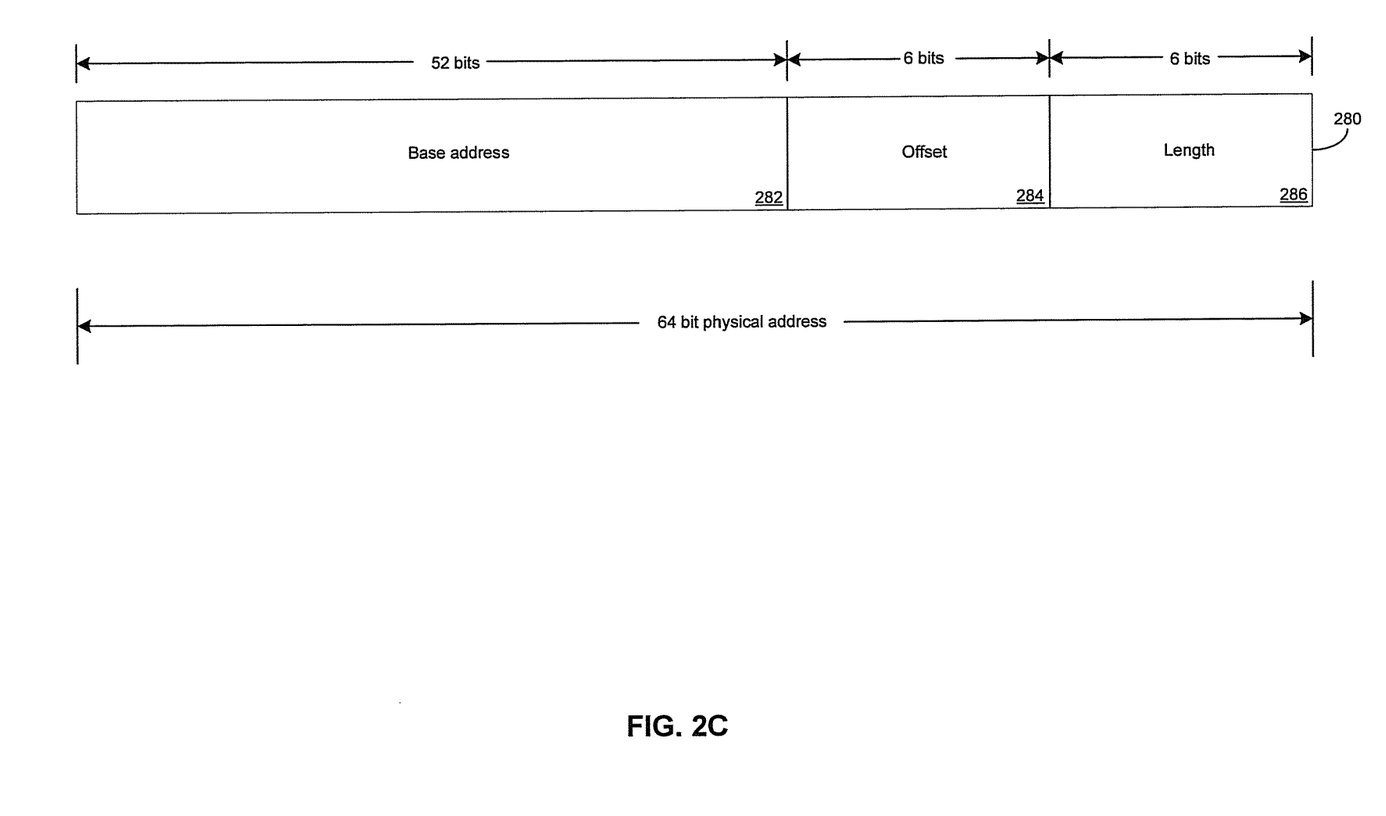
FIG. 2C is a block diagram illustrating exemplary encoding of a logical pair of PBLEs, in accordance with an embodiment of the invention.

FIG. 2C is a block diagram illustrating exemplary encoding of a logical pair of PBLEs, in accordance with an embodiment of the invention. Referring to FIG. 2C, there is shown, for example, a 64 bit physical address with 4K blocks. The most significant 52 bits may be retained as the physical address or the base address 282, and may be padded on the right with 12 zeroes, for example. The next 6 bits may encode the offset 284 into a segment of the logical address. The following 6 bits may encode the length 286 of the segment in pages.

The logical address may be divided by the page/block size. The dividend may be utilized to index a particular PBLE, and the remainder may be added to the result of the division operation. In accordance with an exemplary embodiment of the invention, the logical address may be divided by double the page/block size for a pair of PBLEs. The remainder of the division operation may be then added to the first of the contiguous memory locations if the remainder of the division operation fits within the remainder of the first segment. The remainder of the division operation may be added to the second of the contiguous memory locations if the remainder of the division operation does not fit within the remainder of the first segment.

A plurality of memory mapping schemes may allow variable page sizes and may specify logical segments. In accordance with an embodiment of the invention, at least a pair of contiguous memory locations may be created for optimizing caching for a given arbitrary page or block based memory map. The data may be stored in the same space that would have been required for the encoding of an unenhanced memory map.

The host processor 124 may disable the referenced physical page from being reassigned until the mapping entry is removed. The cache memory/buffer 126 may be pinned. The kernel page reclamation after a page fault may function so that it does not assign the page to a new process before the host processor 124 has cleared the memory map and PBLEs. The PBLE index may facilitate caching of PBLEs. The pairing of pages/blocks in the PBLE index may enable a single fetch to place a plurality of direct data placement (DDP) segments. A single lookup using an optimized PBL format may be enabled to translate multiple successive segments that may span a plurality of virtual pages. A cached PBLE index entry may be allowed to represent a portion of user memory when a user has been allocated memory that is physically contiguous.

Table 1 illustrates an encoded optimized PBLE table corresponding to a conventional PBLE table, in accordance with an embodiment of the invention.

TABLE 1

| Virtual Address (within context of PBL) | Un-optimized PBL Entries for 4K pages | Optimized Entry Pairs |
|---|---|---|
| 0x0000000040000000 | 0x0000000140000000 | 0x0000000140000007 (32 KB) |
| 0x0000000040001000 | 0x0000000140001000 | 0x0000000230001001 (8 KB) |
| 0x0000000040002000 | 0x0000000140002000 | 0x0000000140002085 (24 KB) |
| 0x0000000040003000 | 0x0000000140003000 | 0x0000000230001001 (8 KB) |
| 0x0000000040004000 | 0x0000000140004000 | 0x00000001400040C3 (16 KB) |
| 0x0000000040005000 | 0x0000000140005000 | 0x0000000230001001 (8 KB) |
| 0x0000000040006000 | 0x0000000140006000 | 0x0000000140006101 (8 KB) |
| 0x0000000040007000 | 0x0000000140007000 | 0x0000000230001001 (8 KB) |
| 0x0000000040008000 | 0x0000000230001000 | 0x0000000230001001 (8 KB) |
| 0x0000000040009000 | 0x0000000230002000 | 0x0000000570007001 (8 KB) |
| 0x000000004000a000 | 0x0000000570007000 | 0x0000000570007000 (4 KB) |
| 0x000000004000b000 | 0x0000000700008000 | 0x0000000700008000 (4 KB) |

Each PBLE may be modded by the page/block size, for example, 4 KB. The remainder plus one may be multiplied by the page/block size to determine the block size. The remainder may be subtracted to yield the base address of the PBLE. For example, in Table 1, a 48 KB virtual range maps to four physically contiguous ranges that are 32 KB, 8 KB, 4 KB and 4 KB.

A PBLE index may be addressed by a host object pointer that may reference the zeroeth entry in the table. The PBLE index may be calculated by applying a steering tag's (STag's) address adjust function to a 64-bit target offset, for example. The result may be divided by the STag's page pair size function to obtain the PBLE index and the remaining offset. A PBLE may be fetched, which may encode the base address. For example, the base address may be 0x0000000140000007. The contiguous length starting at that base address may be expressed as a multiple of the page/block size. In this case, the contiguous length may be 8 pages or 32 KB, for example. The base address for the virtual address may be determined. For example, the base address of the virtual address may be 0x0000000230001001. The contiguous length starting at the virtual address may be expressed as a multiple of the page/block size. In this case, the contiguous length may be 2 pages or 8 KB, for example. The remaining offset may be compared with the length of the first block. If the remaining offset is less than the length of the first block, then the target physical address may be calculated by adding the remainder to the base physical address. If the remaining offset is not less than the length of the first block, the length of the first block may be subtracted from the remainder, and the result may be added to the second base address.

Figure 3:
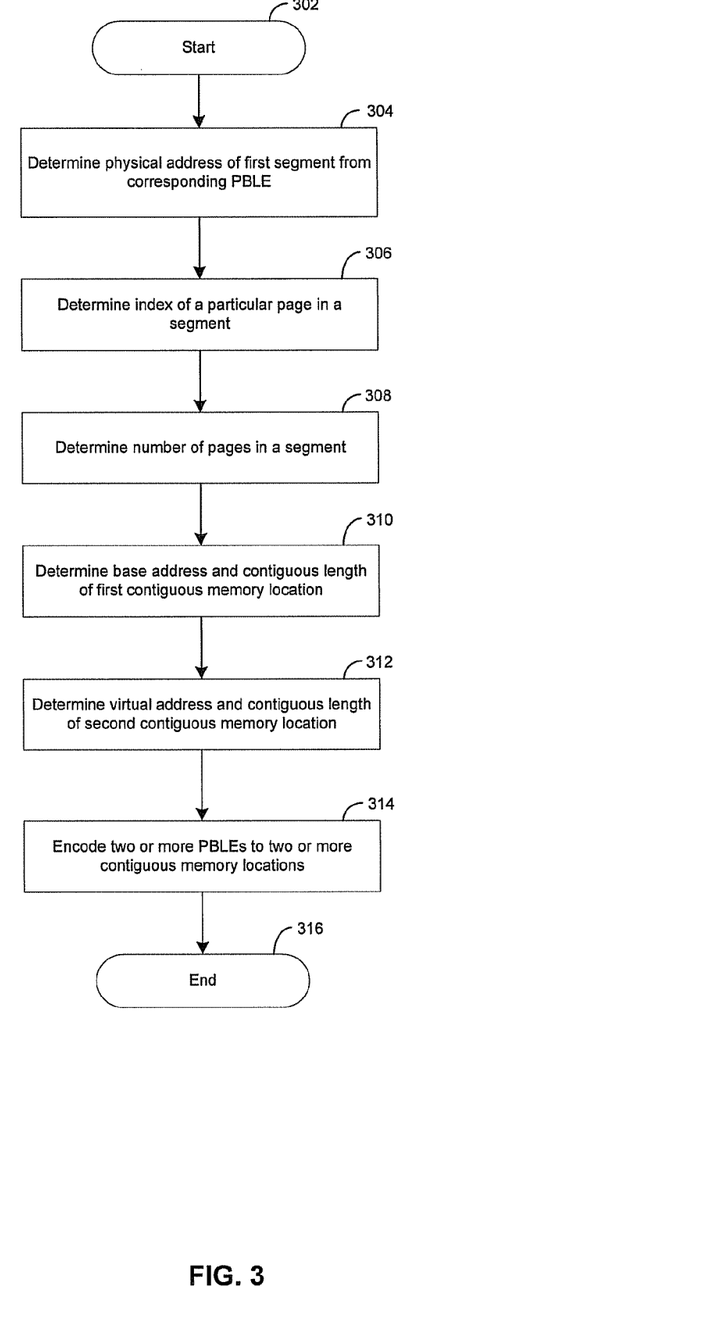
FIG. 3 is a flowchart illustrating exemplary steps for combining page buffer list entries (PBLEs) to optimize caching of translated addresses, in accordance with an embodiment of the invention.

FIG. 3 is a flowchart illustrating exemplary steps for combining page buffer list entries (PBLEs) to optimize caching of translated addresses, in accordance with an embodiment of the invention. Referring to FIG. 3, exemplary steps may begin at step 302. In step 304, the physical address of a first segment may be calculated according to the following equation:

$$seg\_phys\_addr[0]=pble\_entry[0]-pble\_entry[0] \bmod page\_block\_size$$

where seg_phys_addr[0] is the physical address of the first segment, pble_entry[0] is the first PBLE, and page_block_size is the size of the page/block. In step 306, the index of a particular page in a segment may be calculated according to the following equation:

$$seg\_pages[x]=(seg\_phys\_addr[x] \bmod page\_block\_size) \operatorname{div} MAX\_SEQ\_BLOCKS$$

where seg_pages[x] is the index of the $X^{th}$ page segment, seg_phys_addr[x] is the physical address of the $X^{th}$ page segment, and MAX_SEQ_BLOCKS is the maximum number of sequential blocks. The maximum number of sequential blocks, MAX_SEQ_BLOCKS may be less than the square root of the size of the page/block, page_block_size. In step 308, the number of pages in a segment for a given logical address may be obtained by calculated according to the following equation:

$$(phys\_addr \bmod page\_block\_size) \bmod MAX\_SEQ\_BLOCKS$$

where phys_addr is the physical address of the particular page segment. The logical address of a second segment may be calculated by adding the size of the first segment to the logical address of the first segment.

In step 310, a base address and a contiguous length of the first of the two contiguous memory locations may be determined. In step 312, a virtual address and a contiguous length of the second of the two contiguous memory locations may be determined. The RNIC 128 may enable calculation of the remainder of the physical address corresponding to the two page buffer list entries 201 and 203 by dividing the physical address by a number of sequential blocks. In step 314, the RNIC 128 may enable encoding of at least two page buffer list entries, for example, PBLEs 201 and 203 in a remote direct memory access (RDMA) memory map into at least two contiguous memory locations, for example, 222a and 222b by utilizing a remainder of a physical address corresponding to the two page buffer list entries. Control then passes to end step 316.

In accordance with an exemplary embodiment of the invention, a method and system for combining page buffer list entries (PBLEs) to optimize caching of translated addresses may comprise a RNIC 128 that enables encoding of at least two page buffer list entries, for example, PBLEs 201 and 203 into a remote direct memory access (RDMA) memory map to at least two contiguous memory locations, for example, 222a and 222b by utilizing a remainder of a physical address corresponding to the two page buffer list entries. The first memory location 222a of the two contiguous memory locations may comprise a base address and a contiguous length of the first of the two page buffer list entries. The second memory location 222b of the two contiguous memory locations may comprise a virtual address and a contiguous length of the second of the two page buffer list entries. The RNIC 128 may enable calculation of the remainder of the physical address corresponding to the two page buffer list entries 201 and 203 by dividing the physical address by a number of sequential blocks. The number of sequential blocks may be less than a square root of at least one of: a page size and a block size. The RNIC 128 may enable utilization of a portion of a plurality of bits of the physical address 280 to encode an offset 284 of the two page buffer list entries. The RNIC 128 may enable utilization of a portion of a plurality of bits of the physical address 280 to encode a length 286 of the two page buffer list entries.

In accordance with an embodiment of the invention, after decoding the paired PBL entries, for example, PBLEs 201 and 203, the RNIC 128 may have information regarding the two virtually contiguous memory locations, for example, 222a and 222b that may also be physically contiguous. This information may be cached by storing the base virtual address, its translation, the length of the first contiguous memory location, the base physical address of the first contiguous memory location and the length of the base physical address of the first contiguous memory location. The caching of this information may be advantageous when the RNIC 128 has knowledge that these mappings may remain valid unless it receives a notification that the memory map may have been modified. The RNIC 128 may be enabled to trust its cached mappings based on a given memory map that may remain valid until the RNIC 128 is informed to invalidate caches based on that memory map.

Another embodiment of the invention may provide a machine-readable storage, having stored thereon, a computer program having at least one code section executable by a machine, thereby causing the machine to perform the steps as described above for combining page buffer list entries (PBLEs) to optimize caching of translated addresses.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing data, the method comprising: determining a physical address of a packet segment based on encoding a plurality of page buffer list entries into at least two contiguous memory locations utilizing a remainder of said physical address.

2. The method according to claim 1, comprising determining said remainder of said physical address based on dividing said first of said plurality of page buffer list entries by a maximum number of sequential blocks.

3. The method according to claim 2, wherein a first memory location of said at least two contiguous memory locations comprises a base address and a contiguous length of said first of said plurality of page buffer list entries.

4. The method according to claim 3, wherein a second memory location of said at least two contiguous memory locations comprises a virtual address and a contiguous length of a second of said plurality of page buffer list entries.

5. The method according to claim 2, comprising calculating a remainder of a logical address of said packet segment by dividing said logical address by double of one of: a page size or a block size.

6. The method according to claim 5, comprising adding said calculated remainder of said logical address to a first memory location of said at least two contiguous memory locations, if said calculated remainder of said logical address is less than said calculated remainder of said physical address.

7. The method according to claim 6, comprising adding said calculated remainder of said logical address to a second memory location of said at least two contiguous memory locations, if said calculated remainder of said logical address is not less than said calculated remainder of said physical address.

8. The method according to claim 2, wherein said maximum number of sequential blocks is less than a square root of one or both of: a page size and/or a block size.

9. The method according to claim 1, comprising determining said physical address of said packet segment spanning a plurality of virtual pages based on a single lookup of said encoded plurality of page buffer list entries.

10. The method according to claim 1, comprising determining said physical address of said packet segment based on determining an offset of a page in said packet segment and a length of said packet segment.

11. The method according to claim 1, comprising encoding, by a RDMA enabled NIC (RNIC), said plurality of page buffer list entries into said at least two contiguous memory locations.

12. A system for processing data, the system comprising: one or more circuits being operable to determine a physical address of a packet segment based on encoding a plurality of page buffer list entries into at least two contiguous memory locations utilizing a remainder of said physical address.

13. The system according to claim 12, wherein said one or more circuits are operable to determine said remainder of said physical address based on dividing said first of said plurality of page buffer list entries by a maximum number of sequential blocks.

14. The system according to claim 13, wherein a first memory location of said at least two contiguous memory locations comprises a base address and a contiguous length of said first of said plurality of page buffer list entries.

15. The system according to claim 14, wherein a second memory location of said at least two contiguous memory locations comprises a virtual address and a contiguous length of a second of said plurality of page buffer list entries.

16. The system according to claim 13, wherein said one or more circuits are operable to calculate a remainder of a logical address of said packet segment by dividing said logical address by double of one of: a page size or a block size.

17. The system according to claim 16, wherein said one or more circuits are operable to add said calculated remainder of said logical address to a first memory location of said at least two contiguous memory locations, if said calculated remainder of said logical address is less than said calculated remainder of said physical address.

18. The system according to claim 17, wherein said one or more circuits are operable to add said calculated remainder of said logical address to a second memory location of said at least two contiguous memory locations, if said calculated remainder of said logical address is not less than said calculated remainder of said physical address.

19. The system according to claim 13, wherein said maximum number of sequential blocks is less than a square root of one or both of: a page size and/or a block size.

20. The system according to claim 12, wherein said one or more circuits are operable to determine said physical address of said packet segment spanning a plurality of virtual pages based on a single lookup of said encoded plurality of page buffer list entries.

21. The system according to claim 12, wherein said one or more circuits are operable to determine said physical address of said packet segment based on determining an offset of a page in said packet segment and a length of said packet segment.

22. The system according to claim 12, wherein said one or more circuits comprises a RDMA enabled NIC (RNIC) that is operable to encode said plurality of page buffer list entries into said at least two contiguous memory locations.

* * * * *